(12) United States Patent
Zemenchik et al.

(10) Patent No.: US 9,327,378 B2
(45) Date of Patent: May 3, 2016

(54) BLADE SHARPENING SYSTEM FOR AGRICULTURAL IMPLEMENTS

(75) Inventors: Robert A. Zemenchik, Kenosha, WI (US); Ivan Rieke, Congerville, IL (US); Mark Hoffman, Deer Creek, IL (US)

(73) Assignee: CNH Industrial America LLC, New Holland, PA (US)

( * ) Notice: Subject to any disclaimer, the term of this patent is extended or adjusted under 35 U.S.C. 154(b) by 126 days.

(21) Appl. No.: 14/366,615

(22) PCT Filed: Aug. 31, 2012

(86) PCT No.: PCT/US2012/053525
§ 371 (c)(1),
(2), (4) Date: Jun. 18, 2014

(87) PCT Pub. No.: WO2013/033635
PCT Pub. Date: Mar. 7, 2013

(65) Prior Publication Data
US 2014/0357166 A1    Dec. 4, 2014

Related U.S. Application Data

(60) Provisional application No. 61/529,698, filed on Aug. 31, 2011.

(51) Int. Cl.
*B24B 3/46* (2006.01)
*B24B 27/00* (2006.01)
(Continued)

(52) U.S. Cl.
CPC ............. *B24B 3/466* (2013.01); *A01B 15/16* (2013.01); *A01B 23/06* (2013.01); *B24B 27/0007* (2013.01); *B24B 27/0015* (2013.01); *B24B 27/0084* (2013.01); *B24B 41/02* (2013.01)

(58) Field of Classification Search
CPC .. B24B 3/446; B24B 27/007; B24B 27/0015; B24B 27/0084; B24B 41/02
USPC .................................................. 451/349, 420
See application file for complete search history.

(56) References Cited

U.S. PATENT DOCUMENTS

| 1,183 | A | * | 6/1839 | Tibbets ............... B24B 27/0015 |
|---|---|---|---|---|
| | | | | 451/236 |
| 323,344 | A | | 7/1885 | La Dow |

(Continued)

FOREIGN PATENT DOCUMENTS

FR    2592607 A1 *  7/1987  .......... B24B 27/0015

OTHER PUBLICATIONS

"EdgeCare" Disc Sharpening System; 2010 Ingersoll Tillage Group, Inc.; http://www.ingersolltillage.com/edgecare.html.
(Continued)

*Primary Examiner* — George Nguyen
(74) *Attorney, Agent, or Firm* — Rebecca L. Henkel (57) ABSTRACT

A blade sharpening system is provided that includes a base, and a pivoting member rotatably coupled to the base by a shaft. The blade sharpening system also includes a sharpener coupled to the pivoting member and configured to engage a generally circular blade of an agricultural implement while the generally circular blade is mounted on the agricultural implement. The pivoting member is configured to enable movement of the sharpener to accommodate lateral variations in a profile of the generally circular blade, and the shaft is movable relative to the pivoting member to adjust a contact force between the sharpener and the generally circular blade.

19 Claims, 4 Drawing Sheets

(51) Int. Cl.
*B24B 41/02* (2006.01)
*A01B 15/16* (2006.01)
*A01B 23/06* (2006.01)

(56) References Cited

U.S. PATENT DOCUMENTS

| | | | |
|---|---|---|---|
| 508,719 A * | 11/1893 | Ingle et al. | B24B 3/466 76/85 |
| 517,810 A | 4/1894 | Shaw | |
| 548,198 A | 10/1895 | Hoyman | |
| 555,936 A | 3/1896 | Elliott | |
| 603,172 A | 4/1898 | Christopherson | |
| 718,966 A | 1/1903 | Grimm | |
| 872,981 A | 12/1907 | Wissler | |
| 939,115 A | 11/1909 | Ward | |
| 939,713 A | 11/1909 | Klenke | |
| 946,675 A | 1/1910 | Karr et al. | |
| 958,077 A | 5/1910 | Bender | |
| 1,003,340 A | 9/1911 | Combs | |
| 1,044,137 A | 11/1912 | Cassady | |
| 1,069,499 A | 8/1913 | Trone | |
| 1,083,687 A | 1/1914 | Larson | |
| 1,172,763 A | 2/1916 | Bremer | |
| 1,339,043 A | 5/1920 | Schmidt | |
| 1,406,716 A | 2/1922 | Bain | |
| 1,420,568 A | 6/1922 | Nash | |
| 1,479,190 A * | 1/1924 | Lindsay | B24B 3/466 76/85 |
| 1,481,621 A * | 1/1924 | Neuman | B24B 3/466 451/258 |
| 1,738,003 A | 12/1929 | Hill | |
| 1,838,657 A | 12/1931 | Case | |
| 1,826,517 A | 10/1937 | Klockner et al. | |
| 2,185,519 A | 1/1940 | Randall | |
| 2,193,854 A | 3/1940 | Benedict | |
| 2,510,601 A | 6/1950 | Pater | |
| 2,517,950 A | 8/1950 | Weirich | |
| 2,533,009 A | 12/1950 | Harsh | |
| 2,541,829 A * | 2/1951 | Peddicord | A01B 23/06 451/423 |
| 2,565,916 A | 8/1951 | Frusher | |
| 2,597,325 A | 5/1952 | Hodges | |
| 2,873,558 A * | 2/1959 | Olsen | B24B 27/0015 451/236 |
| 2,933,865 A | 4/1960 | Miller | |
| 3,019,568 A * | 2/1962 | Saners | B24B 3/42 451/141 |
| 3,205,623 A | 9/1965 | Clayborne et al. | |
| 3,570,193 A | 3/1971 | Barrett | |
| 3,694,969 A | 10/1972 | Hahn et al. | |
| 3,833,067 A | 9/1974 | Peterson, Jr. et al. | |
| 4,113,030 A | 9/1978 | Walker | |
| 5,725,415 A | 3/1998 | Bernhard | |
| 6,223,832 B1 | 5/2001 | Hook et al. | |
| 6,758,730 B1 | 7/2004 | Bernhard | |
| 7,114,413 B1 | 10/2006 | Behan | |
| 7,503,835 B2 | 3/2009 | Cotton | |
| 8,535,120 B2 | 9/2013 | Zemenchik et al. | |
| 8,690,642 B2 * | 4/2014 | Meiners | A01B 15/16 451/349 |
| 2006/0225901 A1* | 10/2006 | Blunier | A01B 23/06 172/558 |
| 2007/0026771 A1 | 2/2007 | Harden et al. | |
| 2008/0029280 A1* | 2/2008 | Meidinger | A01B 23/06 172/559 |
| 2008/0248732 A1 | 10/2008 | Warrenburg | |
| 2014/0349555 A1 | 11/2014 | Zemenchik | |

OTHER PUBLICATIONS

PCT International Search Report and Written Opinion dated Nov. 22, 2012 for PCT/US2012/053523.

PCT International Preliminary Report on Patentability dated Mar. 13, 2014 for PCT/US2012/053523.

PCT International Search Report and Written Opinion dated Nov. 29, 2012.

PCT International Preliminary Report on Patentability dated Mar. 13, 2014.

* cited by examiner

BLADE SHARPENING SYSTEM FOR AGRICULTURAL IMPLEMENTS

CROSS REFERENCE TO RELATED APPLICATION

This application claims priority from and the benefit of U.S. Provisional Application Ser. No. 61/529,698, entitled "BLADE SHARPENING SYSTEM FOR AGRICULTURAL IMPLEMENTS", filed Aug. 31, 2011, which is hereby incorporated by reference in its entirety.

BACKGROUND

The invention relates generally to ground working equipment, such as agricultural equipment, and more specifically, to a blade sharpening system for agricultural implements.

It is well known that to attain the best agricultural performance from a piece of land, a farmer must cultivate the soil, typically through a tilling operation. Common tilling operations include plowing, harrowing, and sub-soiling. Modern farmers perform these tilling operations by pulling a tilling implement behind a motorized tractor. Depending on the crop selection and the soil conditions, a farmer may need to perform several tilling operations at different times over a crop cycle to properly cultivate the land to suit the crop choice. In one type of tilling operation, rows of blades are pulled through soil to break up clods or lumps of soil, as well as old plant material to provide a more amenable soil structure for planting and to level the soil surface.

As will be appreciated, maintaining a sharp edge on the blades enables the blades to cut plant residue efficiently. Unfortunately, contact with the soil causes the edge of the blades to become dull over time. Therefore, a farmer may periodically (e.g., every few months) sharpen the blades to maintain efficient operation of the tillage implement. Due to the large number of blades on a typical tillage implement, the process of sharpening each blade may be exceedingly time consuming. For example, a farmer may remove each blade from the implement and sharpen the edge of the blade with a handheld grinder. Alternatively, the farmer may utilize a portable blade sharpener having transport wheels. The portable sharpener may be successively rolled into alignment with each blade to sharpen the edge of the respective blade. Certain portable sharpeners include a grinder fixed to a rolling base. In such configurations, the portable sharpener may be positioned such that a grinding disc of the grinder contacts an edge of the blade. The grinder may then be activated as the blade is rotated to facilitate blade sharpening. However, because the position of the grinding disc is fixed with respect to the blade, the portable sharpener may be unable to effectively sharpen fluted or wavy blades.

BRIEF DESCRIPTION

In one embodiment, a blade sharpening system includes a base, and a pivoting member rotatably coupled to the base by a shaft. The blade sharpening system also includes a sharpener coupled to the pivoting member and configured to engage a generally circular blade of an agricultural implement while the generally circular blade is mounted on the agricultural implement. The pivoting member is configured to enable movement of the sharpener to accommodate lateral variations in a profile of the generally circular blade, and the shaft is movable relative to the pivoting member to adjust a contact force between the sharpener and the generally circular blade.

In another embodiment, a blade sharpening system includes a shaft, and a base having a first plurality of recesses configured to receive the shaft. The blade sharpening system also includes a pivoting member having a second plurality of recesses configured to receive the shaft. The shaft is selectively securable to each of the first plurality of recesses, and to each of the second plurality of recesses to facilitate movement of the shaft relative to the pivoting member. The blade sharpening system further includes a sharpener coupled to the pivoting member and configured to engage a generally circular blade of an agricultural implement while the generally circular blade is mounted on the agricultural implement. The pivoting member is configured to enable movement of the sharpener to accommodate lateral variations in a profile of the generally circular blade, and movement of the shaft relative to the pivoting member facilitates adjustment of a contact force between the sharpener and the generally circular blade.

In a further embodiment, a blade sharpening system includes a first substantially flat plate, and a second substantially flat plate rotatably coupled to the first substantially flat plate by a shaft. The shaft is configured to facilitate rotation of the second substantially flat plate relative to the first substantially flat plate about an axis substantially perpendicular to the first and second substantially flat plates. The blade sharpening system also includes a sharpener coupled to the second substantially flat plate and configured to engage a generally circular blade of an agricultural implement while the generally circular blade is mounted on the agricultural implement. The second substantially flat plate is configured to enable movement of the sharpener to accommodate lateral variations in a profile of the generally circular blade, and the shaft is movable relative to the second substantially flat plate to adjust a contact force between the sharpener and the generally circular blade.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
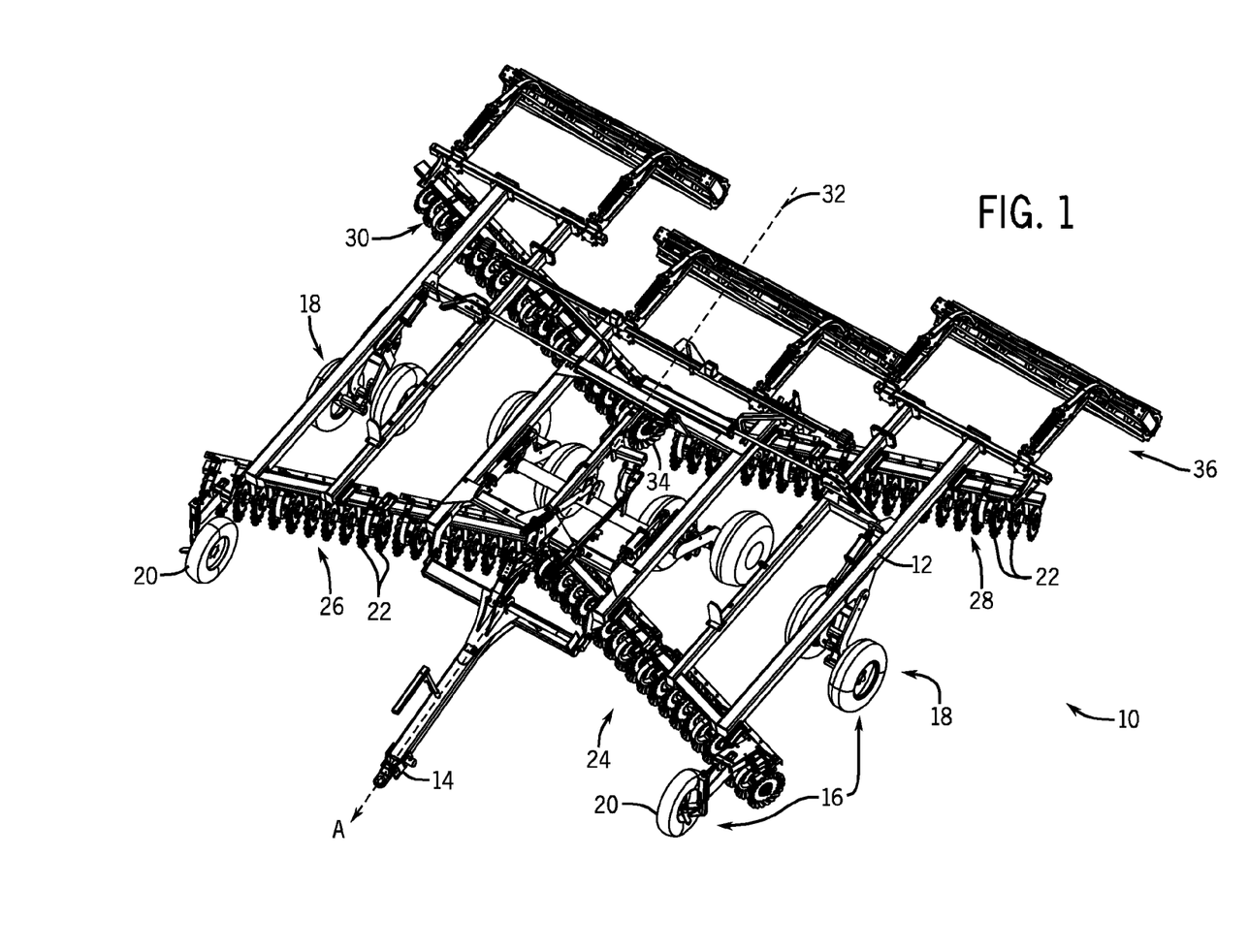
FIG. 1 is a perspective view of an exemplary agricultural implement.

Turning now to the drawings, FIG. 1 is a perspective view of an exemplary agricultural implement 10. While a vertical tilling implement 10 is shown and described below, it should be appreciated that the blade sharpening system may be utilized to sharpen blades on any other suitable agricultural implement. As will be appreciated, an agricultural vehicle is configured to pull the vertical tilling implement 10 in a direction of motion A. The vertical tilling implement 10 includes a main frame 12. The main frame 12 has a hitch 14 on the front end that may be used to connect the vertical tilling implement 10 to the agricultural vehicle, such as a tractor or other prime mover. Additionally, a set of wheels 16 is connected to the main frame 12. The set of wheels 16 is oriented in a direction that is in general alignment with the direction of motion A. The set of wheels 16 includes a set of center wheels 18 and a set of pivoting wheels 20. The set of center wheels 18 is attached across the main frame 12 at positions, for example, roughly midway between the front and rear ends of the main frame 12. The set of center wheels 18 may include a system for adjusting the distance between the main frame 12 and the set of center wheels 18. This system for adjusting may permit the set of center wheels 18 to be statically fixed during the movement of the vertical tilling implement 10 or to be dynamically adjustable as the vertical tilling implement 10 travels. The set of pivoting wheels 20 is connected to the front distal ends of the main frame 12, and may reduce the amount of lateral and/or vertical movement of the vertical tilling implement 10 as it is pulled.

The vertical tilling implement 10 also includes multiple rows of fluted-concave blades 22 attached to the main frame 12. In certain configurations, the rows of fluted-concave blades 22 are indexed. In particular, the rows of fluted-concave blades 22 include a front left row 24, a front right row 26, a rear left row 28, and a rear right row 30. When indexed, the front left row 24 and the front right row 26 are aligned with the rear left row 28 and the rear right row 30 such that areas of ground between the blades in the front left row 24 and the front right row 26 are engaged by the blades in the rear left row 28 and the rear right row 30 as the tilling implement is pulled forward.

In the illustrated embodiment, the front left row 24 is symmetric about a centerline 32 of the vertical tilling implement 10 with the front right row 26. Likewise, the rear left row 28 is symmetric about the centerline 32 of the vertical tilling implement 10 with the rear right row 30. Additionally, the front left row 24 is substantially symmetric about a line perpendicular to the direction of motion A with the rear left row 28. Likewise, the front right row 26 is substantially symmetric about a line perpendicular to the direction of motion A with the rear right row 30. These general symmetries may involve some of the rows being offset relative to the others to achieve the indexing of the blades as described above.

When the rows of concave blades 22 are arranged in a symmetrical arrangement about the centerline 32, such as illustrated in FIG. 1, a gap between each side of the symmetrical rows may be created. A center tilling member 34 may be placed in this gap to ensure that all the soil passing under the vertical tilling implement 10 is tilled as the tilling implement is pulled forward. The center tilling member 34 may be a coulter, as shown in FIG. 1, another fluted blade, or the like.

While four rows of fluted-concave blades 22 are employed in the illustrated embodiment, it should be appreciated that more or fewer rows may be utilized in alternative embodiments. Additionally, while the illustrated embodiment shows the rows of fluted-concave blades 22 having an x-shaped configuration based on the described symmetry, the rows of fluted-concave blades 22 may have a different configuration. For example, the rows of fluted-concave blades 22 may have a diamond configuration, a k-shaped configuration, or all may be parallel with each other in a direction perpendicular to the direction of motion A. Furthermore, it is contemplated that some or all of the rows may be configured in asymmetric arrangements.

Rolling basket assemblies 36 are connected to the rear end of the main frame 12 to provide downward pressure. As will be appreciated, the rolling basket assemblies 36 may be replaced with any other acceptable member that is capable of exerting a desired downward pressure, including drag harrows, and the like. Although FIG. 1 shows three rolling basket assemblies 36, two of which having rotational axes which are not collinear with the third, the rolling basket assemblies 36 may include fewer or more members providing downward force.

As discussed in detail below, a blade sharpening system may be employed to sharpen the edges of the fluted-concave blades 22, thereby maintaining efficient operation of the implement 10. As will be appreciated, maintaining a sharp edge on the blades 22 enables the blades 22 to cut plant residue efficiently. Consequently, it may be desirable to periodically (e.g., every few months) sharpen each blade 22 on the implement 10. The blade sharpening system described below includes a base, and a pivoting member rotatably coupled to the base by a shaft. The blade sharpening system also includes a sharpener coupled to the pivoting member and configured to engage a blade 22 of the agricultural implement 10. The pivoting member is configured to enable movement of the sharpener to accommodate lateral variations in a profile of the blade 22, and the shaft is movable relative to the pivoting member to adjust a contact force between the sharpener and the blade 22. Consequently, the blade sharpening system may provide a substantially uniform blade edge despite lateral variations in the blade profile.

While the implement 10 shown and described below utilizes generally circular fluted-concave blades, it should be appreciated that alternative implements may employ other blade configurations. For example, certain implements may include fluted blades having no concavity (i.e., substantially flat). Alternative implements may include smooth-edged concave blades, i.e., blades having no flutes. Yet further implements may employ wavy blades, flat blades, or other blade configurations. In addition, certain implements may utilize a combination of blades. Because certain embodiments of the blade sharpening system are configured to accommodate lateral variations in blade profile, the blade sharpening system may be utilized to sharpen any of the blade configurations described above, or other suitable blade configurations.

Figure 2:
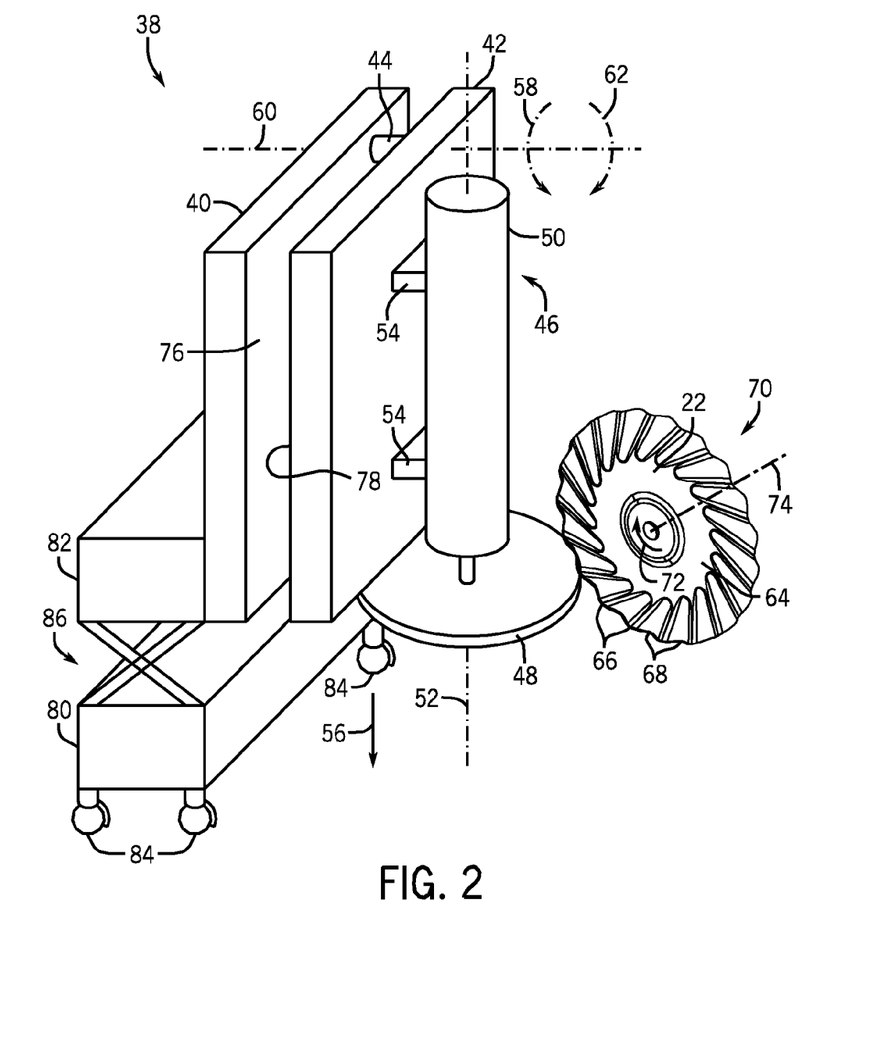
FIG. 2 is a perspective view of an exemplary blade sharpening system that may be employed to sharpen blades of the agricultural implement.

FIG. 2 is a perspective view of an embodiment of a blade sharpening system 38 that may be employed to sharpen blades 22 of the agricultural implement 10. As illustrated, the blade sharpening system 38 includes a base 40, and a pivoting member 42 rotatably coupled to the base 40 by a shaft 44. The blade sharpening system 38 also includes a sharpener 46 coupled to the pivoting member 42 and configured to engage a blade 22 mounted on the agricultural implement 10. The pivoting member 42 is configured to enable movement of the sharpener 46 to accommodate lateral variations in a profile of the blade 22. In the illustrated embodiment, the sharpener 46 includes a grinding disc 48 configured to sharpen an edge of the blade 22, and a motor 50 configured to drive the grinding disc 48 to rotate. As discussed in detail below, the shaft 44 is movable relative to the pivoting member 42 to adjust a contact force between the grinding disc 48 and the blade 22. Consequently, the contact force may be particularly adjusted to enable the grinding disc 48 to remove a small amount of material from the edge of the blade 22, thereby increasing blade sharpness. As a result, the illustrated blade sharpening system 38 may provide a substantially uniform blade edge, thereby enhancing the residue cutting effectiveness of the blade 22.

In the illustrated embodiment, the motor 50 is mounted to the pivoting member 42 in a substantially vertical orientation (i.e., parallel to the vertical axis 52) by a pair of supports 54. In addition, the grinding disc 48 is secured to the motor 50 in a substantially horizontal orientation. Consequently, the grinding disc 48 rotates in a plane substantially perpendicular to the rotational plane of the fluted-concave blade 22. However, it should be appreciated that the motor 50 and/or the grinding disc 48 may be mounted in other orientations in alternative embodiments. For example, in certain embodiments, the motor 50 may be angled relative to the vertical axis 52, thereby varying an angle between the rotational plane of the grinding disc 48 and the rotational plane of the blade 22. In addition, the grinding disc 48 may be coupled to the motor 50 by a bent shaft, thereby varying an angle of the grinding disc 48 relative to the blade 22.

In the illustrated embodiment, the pivoting member 42 is configured to enable movement of the sharpener 46 to accommodate lateral variations in a profile of the fluted-concave blade 22. In addition, the shaft 44 is positioned to bias the sharpener 46 toward the blade 22, thereby establishing a contact force between the grinding disc 48 and the blade 22. As illustrated, the shaft 44 is laterally offset from the center of the pivoting member 42. Consequently, a force in the downward direction 56 caused by the combined weight of the pivoting member 42 and the sharpener 46 induces a torque in a direction 58 about a pivot axis 60 of the shaft 44. As a result, the sharpener 46 is urged toward the blade 22, thereby enabling the grinding disc 48 to maintain contact with the blade 22 despite variations in the blade profile. For example, if the grinding disc 48 encounters a trough in the blade 22, the sharpener 46 is driven in the direction 58 (by the weight of the pivoting member/sharpener), and if the grinding disc 48 encounters a crest in the blade 22, the sharpener 46 is driven in the direction 62 (i.e., against the bias of the pivoting member/sharpener). As a result, the grinding disc 48 follows the contours of the blade 22, thereby enabling the blade sharpening system 38 to provide a substantially uniform blade edge.

As previously discussed, the implement 10 includes fluted-concave blades 22. As illustrated, each blade 22 includes a flat center portion 64 and a series of troughs 66 and crests 68 extending a-radially inward from the outer periphery of the blade 22. The series of troughs 66 and crests 68 forms multiple flutes 70. As will be appreciated, employing fluted-concave blades 22 may permit the use of more aggressive gang angles without resulting in increased blade failures or the generation of large clumps of soil requiring multiple passes, and/or may enable the implement 10 to travel at greater speeds than the known tilling systems having freely-rotatable blades. Unfortunately, blade sharpening systems employing fixed sharpeners may be unable to follow the contours of the fluted blades 22, thereby resulting in an uneven edge that is less effective for cutting plant residue. Consequently, the illustrated blade sharpening system 38 is configured to accommodate lateral variations in blade profile, thereby enabling the blade sharpening system 38 to be utilized for sharpening fluted-concave blades 22, or other suitable blade configurations. While a single blade 22 is shown, it should be appreciated that the blade sharpening system 38 is configured to sharpen each blade 22 of the implement 10 while the blades 22 are mounted on the implement 10.

To sharpen the blade 22, the grinding disc 48 is placed into contact with a blade 22 on the agricultural implement 10, and the sharpener 46 is activated, thereby inducing the grinding disc 48 to rotate. The blade 22 is then rotated in the direction 72 about an axis of rotation 74 (or in an opposite direction about the axis 74). For example, in certain embodiments, the blades 22 of the implement 10 are arranged in gangs that may form part of a row (e.g., 24, 26, 28, or 30). The blades 22 within the gang are keyed to an axle, thereby inducing the blades 22 to rotate together. In such embodiments, a drive unit may be coupled to one of the blades within the gang, or to the gang axle, thereby inducing each blade 22 within the gang to rotate in the direction 72. In certain embodiments, operation of the sharpener 46 may be coordinated with operation of the drive unit such that the blade 22 is driven to rotate as the grinding disc 48 sharpens the edge of the blade 22.

During the sharpening process, the combined weight of the sharpener 46 and the pivoting member 42 urges the pivoting member 42 to rotate about the pivot axis in the direction 58, thereby establishing a contact force between the grinding disc 48 and the blade. Consequently, when the grinding disc 48 encounters a trough 66, the sharpener 46 moves in the direction 58 to accommodate the blade profile variation. Conversely, when the grinding disc 48 encounters a crest 68, the sharpener 46 moves in the direction 62 (i.e., away from the blade 22). In this manner, the illustrated blade sharpening system 38 may accommodate lateral variations in the blade profile, thereby providing a substantially uniform blade edge.

As discussed in detail below, the shaft 44 is movable relative to the pivoting member to adjust a contact force between the sharpener 46 and the blade 22. For example, in certain embodiments, an inner surface 76 of the base 40 and an inner surface 78 of the pivoting member 42 include multiple recesses configured to receive the shaft 44. In such embodiments, the shaft 44 is selectively securable to each recess of the base 40 and to each recess of the pivoting member 42 to facilitate movement of the shaft relative to the pivoting member 42. As the shaft 44 is moved downwardly in the direction 56, the contact force between the grinding disc 48 and the concave-fluted blade 22 increases. Conversely, as the shaft 44 is moved upwardly, the contact force between the grinding disc 48 and the blade 22 decreases. In this manner, a desired contact force may be established by particularly positioning the shaft 44 relative to the pivoting member 42. In the illustrated embodiment, the base 40 and the pivoting member 42 are substantially flat plates, and the shaft 44 is configured to facilitate rotation of the pivoting member 42 about an axis 60 substantially perpendicular to the substantially flat plates. However, it should be appreciated that the base 40 and the pivoting member 42 may be other shapes (e.g., cubical, pyramidal, prismatic, etc.) in alternative embodiments.

In the illustrated embodiment, the blade sharpening system 38 includes a movable platform 80 secured to a support member 82 of the base 40, and configured to facilitate movement of the sharpener 46 relative to the implement 10. For example, during the blade sharpening process, wheels 84 of the movable platform 80 may be locked, thereby maintaining a position of the blade sharpening system 38 relative to the blade 22. After the sharpening process is complete, the wheels 84 may be unlocked, and the blade sharpening system 38 may be moved to a subsequent blade. In this manner, each blade 22 of the implement 10 may be sharpened without removing the blades 22 from the implement 10. Furthermore, the blade sharpening system 38 includes a height adjustment assembly 86 extending between the movable platform 80 and the support member 82. The height adjustment assembly 86 is configured to adjust a height of the sharpener 46, thereby enabling the blade sharpening assembly 38 to accommodate a variety of blade heights (e.g., relative to the ground, relative to the frame of the implement, etc.).

Figure 3:
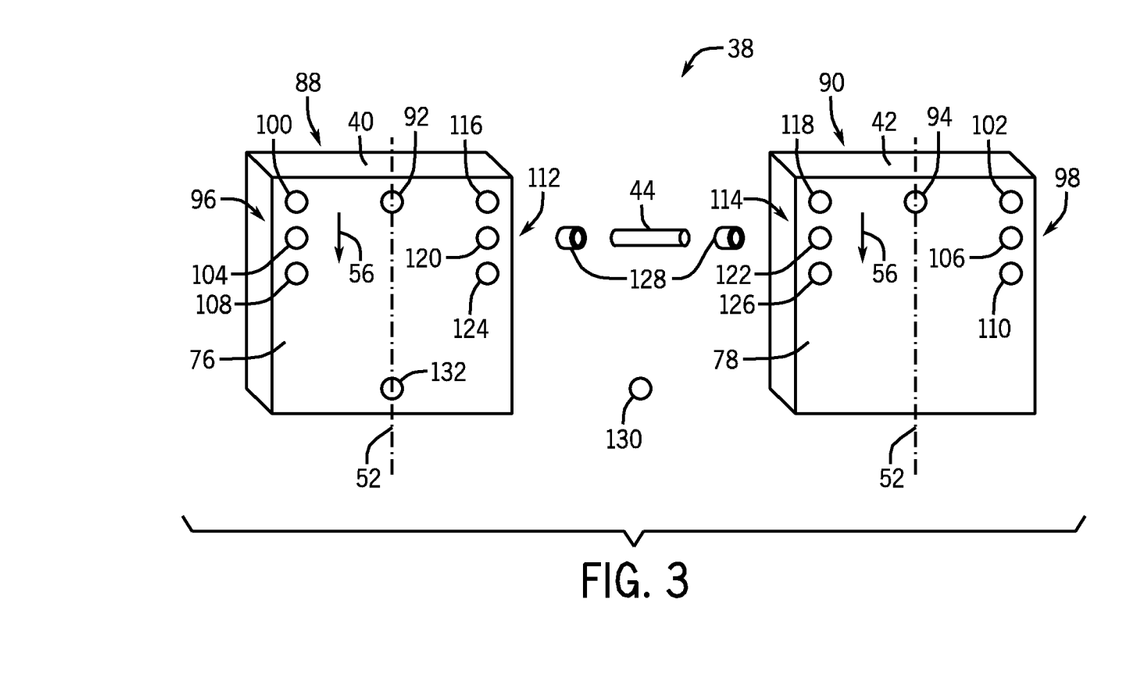
FIG. 3 is an exploded view of the blade sharpening system of FIG. 2, including an embodiment of a pivoting member having multiple recesses configured to receive a shaft.

FIG. 3 is an exploded view of the blade sharpening system 38 of FIG. 2, including an embodiment of a pivoting member having multiple recesses configured to receive a shaft. In the illustrated embodiment, the base 40 includes a first substantially flat plate 88, and the pivoting member 42 includes a second substantially flat plate 90. However, it should be appreciated that the base 40 and the pivoting member 42 may include elements having other shapes in alternative embodiments. As illustrated, the base 40 includes a center recess 92 positioned at the approximately midpoint of the first substantially flat plate 88, and the pivoting member 42 includes a center recess 94 positioned at the approximate midpoint of the second substantially flat plate 90. When the shaft 44 is secured to the center recess 92 of the base 40 and to the center recess 94 of the pivoting member 42, the combined weight of the sharpener 46 and the pivoting member 42 induces the pivoting member 42 to align with the base 40. Consequently, if the grinding disc 48 is placed into contact with the blade 22 while the sharpener 46 is aligned with the vertical axis 52, substantially no contact force will be applied to the blade 22.

To establish a contact force between the grinding disc 48 and the blade 22, the shaft may be coupled to a recess laterally offset from the midpoint of the pivoting member 42, thereby establishing a torque about the pivot axis 60 when the first and second substantially flat plates are aligned. As illustrated, the base 40 includes a first set of recesses vertically distributed along a first lateral side 96 of the base 40, and the pivoting member 42 includes a first set of recesses vertically distributed about a first lateral side 98 of the pivoting member 42. Securing the shaft 44 to corresponding recesses of the respective first sets establishes a torque about the pivot axis 60 when the substantially flat plates are aligned. Consequently, the sharpener 46 is urged toward a blade 22 positioned adjacent to the first lateral side 98 of the pivoting member 42. In the illustrated embodiment, the base 40 includes a first recess 100 positioned along the first lateral side 96 of the base 40, and the pivoting member 42 includes a first recess 102 positioned along the first lateral side 98 of the pivoting member 42. When the shaft 44 is coupled to the first recess 100 of the base 40 and to the first recess 102 of the pivoting member 42, the combined weight of the sharpener 46 and the pivoting member 42 urges the sharpener 46 toward the blade 22, thereby establishing a contact force between the grinding disc 48 and the blade 22.

Furthermore, the base 40 includes a second recess 104 positioned along the first lateral side 96 of the base 40, and the pivoting member 42 includes a second recess 106 positioned along the first lateral side 98 of the pivoting member 42. In addition, the base 40 includes a third recess 108 positioned along the first lateral side 96 of the base 40, and the pivoting member 42 includes a third recess 110 positioned along the first lateral side 98 of the pivoting member 42. Coupling the shaft 44 to the second recesses 104 and 106 increases the contact force between the grinding disc 48 and the blade 22, as compared to coupling the shaft 44 to the first recesses 100 and 102. Similarly, coupling the shaft 44 to the third recesses 108 and 110 increases the contact force between the grinding disc 48 and the blade 22, as compared to coupling the shaft 44 to the second recesses 104 and 106. Consequently, the contact force may be particularly adjusted by coupling the shaft 44 to a desired pair of recesses.

Furthermore, the base 40 includes a second set of recesses vertically distributed along a second lateral side 112 of the base 40, and the pivoting member 42 includes a second set of recesses vertically distributed along a second lateral side 114 of the pivoting member 42. Securing the shaft 44 to corresponding recesses of the respective second sets establishes a torque about the pivot axis 60 when the substantially flat plates are aligned. Consequently, the sharpener 46 is urged toward a blade 22 positioned adjacent to the second lateral side 114 of the pivoting member 42. As illustrated, the base 40 includes a fourth recess 116 positioned along the second lateral side 112 of the base 40, and the pivoting member 42 includes a fourth recess 118 positioned along the second lateral side 114 of the pivoting member 42. When the shaft 44 is coupled to the fourth recess 116 of the base 40 and to the fourth recess 118 of the pivoting member 42, the combined weight of the sharpener 46 and the pivoting member 42 urges the sharpener 46 toward the blade 22, thereby establishing a contact force between the grinding disc 48 and the blade 22.

In addition, the base 40 includes a fifth recess 120 positioned along the second lateral side 112 of the base 40, and the pivoting member 42 includes a fifth recess 122 positioned along the second lateral side 114 of the pivoting member 42. Furthermore, the base 40 includes a sixth recess 124 positioned along the second lateral side 112 of the base 40, and the pivoting member 42 includes a sixth recess 126 positioned along the second lateral side 114 of the pivoting member 42. Coupling the shaft 44 to the fifth recesses 120 and 122 increases the contact force between the grinding disc 48 and the blade 22, as compared to coupling the shaft 44 to the first recesses 116 and 118. Similarly, coupling the shaft 44 to the sixth recesses 124 and 126 increases the contact force between the grinding disc 48 and the blade 22, as compared to coupling the shaft to the fifth recesses 120 and 122. Consequently, the contact force may be particularly adjusted by coupling the shaft 44 to a desired pair of recesses. In addition, a blade 22 positioned adjacent to the first lateral side 98 of the pivoting member 42 may be sharpened by coupling the shaft 44 to corresponding recesses of the respective first sets, and a blade 22 positioned adjacent to the second lateral side 114 of the pivoting member 42 may be sharpened by coupling the shaft 44 to corresponding recesses of the respective second sets.

While the illustrated embodiment includes three recesses within each set, it should be appreciated that alternative embodiments may include sets having more or fewer recesses. For example, in certain embodiments, each set may include 1, 2, 3, 4, 5, 6, or more recesses. In addition, while the recesses are vertically distributed along a respective lateral side in the illustrated embodiment, it should be appreciated that alternative embodiments may include other recess patterns to provide a desired degree of contact force adjustment. For example, in certain embodiments, at least a portion of the recesses may be distributed laterally outward from the midpoint to facilitate adjustment of a torque about the pivot axis. Moreover, while the base 40 includes multiple recesses in the illustrated embodiment, it should be appreciated that alternative embodiments may include a base 40 having a single recess. In such embodiments, the shaft 44 may be selectively securable to each recess of the pivoting member 42 while remaining fixed relative to the base 40.

As illustrated, the blade sharpening system 38 includes a bearing assembly 128 configured to facilitate rotation of the shaft 44 within each recess. In certain embodiments, the bearing assembly 128 may be coupled to the shaft 44, and configured to engage each recess. In alternative embodiments, a bearing assembly 128 may be secured within each recess and configured to receive the shaft 44. In further embodiments, a first portion of the bearing assembly 128 may be coupled to the shaft 44, and a second portion of the bearing assembly 128 may be disposed within each recess. It should be appreciated that the bearing assembly 128 may include a journal bearing, a ball bearing, a jewel bearing, a fluid bearing, a magnetic bearing and/or a flexure bearing. It should also be appreciated that the bearing assembly 128 may include one or more bushings.

In the illustrated embodiment, the blade sharpening system 38 includes a roller bearing 130 configured to block movement of the second substantially flat plate 90 toward the first substantially flat plate 88. In certain embodiments, the roller bearing 130 is disposed within a recess 132 of the first substantially flat plate 88. The recess 132 is configured to capture the bearing 130 while enabling the bearing 130 to rotate within the recess 132. Consequently, the bearing 130 blocks movement of the second substantially flat plate 90 toward the first substantially flat plate 88 while enabling the second substantially flat plate 90 to rotate about the pivot axis 60. In alternative embodiments, the roller bearing 130 may be disposed within a recess in the second substantially flat plate 90. While a single bearing 130 is included within the illustrated embodiment, it should be appreciated that alternative embodiments may employ additional bearings (e.g., 2, 3, 4, 5, 6, or more).

Figure 4:
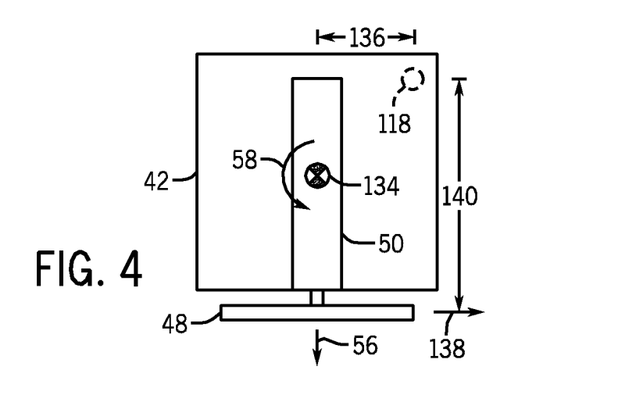
FIG. 4 is a schematic diagram of an embodiment of a blade sharpening system, in which a shaft is mounted to a first recess of a pivoting member.

FIG. 4 is a schematic diagram of an embodiment of the blade sharpening system 38, in which the shaft 44 is mounted to the fourth recess 118 of the pivoting member 42. With the shaft 44 mounted to the fourth recess 118, the combined weight of the pivoting member 42 and the sharpener 46 urges the sharpener 46 to rotate in the direction 58. Specifically, because a center of gravity 134 of the pivoting member/sharpener system is laterally offset from the pivot axis by a distance 136, a torque is induced about the pivot axis. As will be appreciated, the magnitude of the torque is at least partially dependent on the weight of the pivoting member/sharpener system and the distance 136 between the center of gravity 134 and the pivot axis.

When the grinding disc 48 is placed into contact with a blade 22 mounted on the implement 10, the torque establishes a contact force 138 between the grinding disc 48 and the blade 22. The magnitude of the contact force 138 is at least partially dependent on the magnitude of the torque, and a distance 140 between the pivot axis and the grinding disc 48. Consequently, the contact force may be adjusted by varying a vertical position of the shaft relative to the grinding disc 48. For example, positioning the shaft 44 closer to the grinding disc 48 increases the contact force between the grinding disc 48 and the blade 22, and positioning the shaft 44 farther from the grinding disc 48 decreases the contact force.

Figure 5:
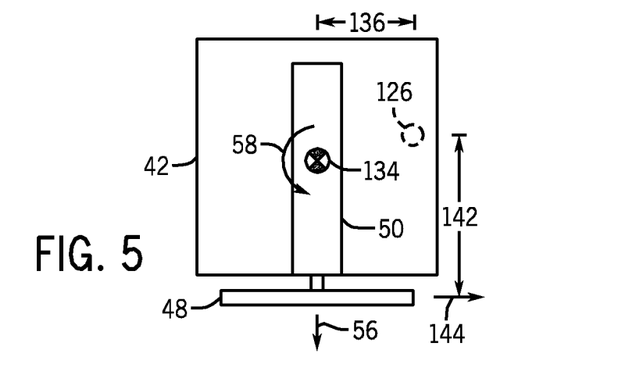
FIG. 5 is a schematic diagram of the blade sharpening system of FIG. 4, in which the shaft is mounted to a second recess of the pivoting member.

FIG. 5 is a schematic diagram of an embodiment of the blade sharpening system 38, in which the shaft 44 is mounted to the sixth recess 126 of the pivoting member 42. Because the lateral distance 136 between the sixth recess 126 and the center of gravity 134 is substantially equal to the lateral distance between the fourth recess 118 and the center of gravity 134, the magnitude of the torque is substantially equal. However, because a distance 142 between the sixth recess 126 and the grinding disc 48 is less than the distance 140 between the fourth recess 118 and the grinding disc 48, a contact force 144 between the grinding disc 48 and the blade 22 is greater than the contact force 138 applied while the shaft 44 is mounted to the fourth recess 118.

While two vertical shaft positions are illustrated in FIGS. 4 and 5, it should be appreciated that the pivoting member 42 may be configured to provide additional shaft positions along the vertical axis to facilitate adjustment of the contact force between the grinding disc 48 and the blade 22. It should also be appreciated that recesses may be distributed across the lateral direction to facilitate adjustment of the torque, thereby varying the contact force. Moreover, while the shaft 44 is coupled to recesses on the second lateral side of the pivoting member 42 in FIGS. 4 and 5, it should be appreciated that the shaft 44 may be coupled to recesses on the first lateral side of the pivoting member to sharpen a blade 22 positioned adjacent to the first lateral side.

Figure 6:
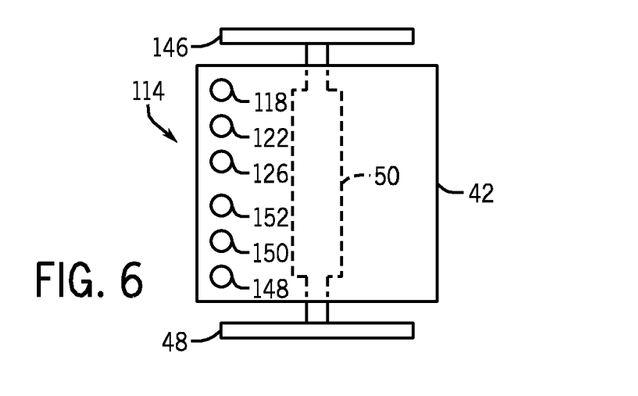
FIG. 6 is a schematic diagram of an embodiment of a pivoting member that may be employed within the blade sharpening system of FIG. 2.

FIG. 6 is a schematic diagram of an alternative embodiment of a pivoting member 42 that may be employed within the blade sharpening system 38 of FIG. 2. In the illustrated embodiment, the sharpener 46 includes a first grinding disc 48 positioned on a first side of the motor 50, and a second grinding disc 146 positioned on a second side of the motor 50. To sharpen a blade 22 positioned adjacent to the second lateral side 114 of the pivoting member 42, the shaft 44 is secured to one of the recesses 118, 122 or 126 of the second set, thereby urging the first grinding disc 48 into contact with the blade 22. To sharpen a blade 22 adjacent to the first lateral side of the pivoting member 42, the pivoting member 42 is rotated approximately 180 degrees such that the second grinding disc 146 is positioned below the pivoting member 42. The shaft 44 is then coupled to the seventh recess 148, to the eighth recess 150 or to the ninth recess 152. Once the shaft is coupled to the desired recess, the combined weight of the pivoting member 42 and the sharpener 46 urges the sharpener 46 to rotate in the direction 62, thereby establishing a contact force between the second grinding disc 146 and the blade 22 positioned adjacent to the first lateral side of the pivoting member 42.

While the illustrated embodiments include a pivoting member 42 having recesses configured to receive the shaft 44, it should be appreciated that alternative embodiments may utilize other mechanisms to adjust the position of the shaft 44 relative to the pivoting member 42. For example, in certain embodiments, the pivoting member 42 may include a rail extending along the vertical axis, and configured to capture an end of the shaft 44. In such embodiments, the shaft 44 is configured to slide along the rail to adjust the vertical position of the shaft 44 relative to the pivoting member 42. In further embodiments, the rail may be angled relative to the vertical axis and/or curved to provide a desired shaft position relative to the pivoting member 42. In addition, it should be appreciated that the grinding disc 48 of the illustrated embodiment may be replaced with an alternative device, such as an edge roller, a polishing wheel or a wire wheel brush in alternative embodiments to sharpen the blades 22.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A blade sharpening system, comprising:
   a base;
   a pivoting member rotatably coupled to the base by a shaft; and
   a sharpener coupled to the pivoting member and configured to engage a generally circular blade of an agricultural implement while the generally circular blade is mounted on the agricultural implement, wherein the pivoting member is configured to enable movement of the sharpener to accommodate lateral variations in a profile of the generally circular blade, and the shaft is movable relative to the pivoting member to adjust a contact force between the sharpener and the generally circular blade; wherein the base comprises a first substantially flat plate, the pivoting member comprises a second substantially flat plate, and the shaft is configured to facilitate rotation of the second substantially flat plate relative to the first substantially flat plate about an axis substantially perpendicular to the first and second substantially flat plates.

2. The blade sharpening system of claim 1, comprising a roller bearing coupled to the first substantially flat plate or to the second substantially flat plate, wherein the roller bearing is configured to block movement of the second substantially flat plate toward the first substantially flat plate.

3. The blade sharpening system of claim 1, wherein the pivoting member comprises a plurality of recesses configured to receive the shaft, and the shaft is selectively securable to each recess to facilitate movement of the shaft relative to the pivoting member.

4. The blade sharpening system of claim 3, comprising a bearing assembly configured to facilitate rotation of the shaft within each recess.

5. The blade sharpening system of claim 3, wherein the plurality of recesses is vertically distributed along a lateral edge of the pivoting member.

6. The blade sharpening system of claim 1, wherein the sharpener comprises a grinding disc configured to sharpen an edge of the generally circular blade, and a motor configured to drive the grinding disc in rotation.

7. The blade sharpening system of claim 6, wherein the sharpener comprises a first grinding disc positioned on a first side of the motor, and a second grinding disc positioned on a second side of the motor.

8. The blade sharpening system of claim 1, comprising a movable platform secured to the base, and configured to facilitate movement of the blade sharpening system relative to the agricultural implement.

9. The blade sharpening system of claim 8, comprising a height adjustment assembly extending between the movable platform and the base, wherein the height adjustment assembly is configured to adjust a height of the sharpener relative to the generally circular blade.

10. A blade sharpening system, comprising:
a shaft;
a base having a first plurality of recesses configured to receive the shaft;
a pivoting member having a second plurality of recesses configured to receive the shaft, wherein the shaft is selectively securable to each of the first plurality of recesses, and to each of the second plurality of recesses to facilitate movement of the shaft relative to the pivoting member; and
a sharpener coupled to the pivoting member and configured to engage a generally circular blade of an agricultural implement while the generally circular blade is mounted on the agricultural implement, wherein the pivoting member is configured to enable movement of the sharpener to accommodate lateral variations in a profile of the generally circular blade, and movement of the shaft relative to the pivoting member facilitates adjustment of a contact force between the sharpener and the generally circular blade.

11. The blade sharpening system of claim 10, comprising a roller bearing coupled to the base or to the pivoting member, wherein the roller bearing is configured to block movement of the pivoting member toward the base.

12. The blade sharpening system of claim 10, wherein the second plurality of recesses includes a first set of recesses vertically distributed along a first lateral side of the pivoting member, and a second set of recesses vertically distributed along a second lateral side of the pivoting member, and wherein securing the shaft to one recess of the first set urges the sharpener toward a first generally circular blade positioned adjacent to the first lateral side of the pivoting member, and securing the shaft to one recess of the second set urges the sharpener toward a second generally circular blade positioned adjacent to the second lateral side of the pivoting member.

13. The blade sharpening system of claim 10, wherein the sharpener comprises a grinding disc configured to sharpen an edge of the generally circular blade, and a motor configured to drive the grinding disc in rotation.

14. The blade sharpening system of claim 10, wherein the base comprises a first substantially flat plate, the pivoting member comprises a second substantially flat plate, and the shaft is configured to facilitate rotation of the second substantially flat plate relative to the first substantially flat plate about an axis substantially perpendicular to the first and second substantially flat plates.

15. A blade sharpening system, comprising:
a first substantially flat plate;
a second substantially flat plate rotatably coupled to the first substantially flat plate by a shaft, wherein the shaft is configured to facilitate rotation of the second substantially flat plate relative to the first substantially flat plate about an axis substantially perpendicular to the first and second substantially flat plates; and
a sharpener coupled to the second substantially flat plate and configured to engage a generally circular blade of an agricultural implement while the generally circular blade is mounted on the agricultural implement, wherein the second substantially flat plate is configured to enable movement of the sharpener to accommodate lateral variations in a profile of the generally circular blade, and the shaft is movable relative to the second substantially flat plate to adjust a contact force between the sharpener and the generally circular blade.

16. The blade sharpening system of claim 15, wherein the second substantially flat plate comprises a plurality of recesses configured to receive the shaft, and the shaft is selectively securable to each recess to facilitate movement of the shaft relative to the second substantially flat plate.

17. The blade sharpening system of claim 16, wherein the plurality of recesses is vertically distributed along a lateral edge of the second substantially flat plate.

18. The blade sharpening system of claim 15, comprising a roller bearing coupled to the first substantially flat plate or to the second substantially flat plate, wherein the roller bearing is configured to block movement of the second substantially flat plate toward the first substantially flat plate.

19. The blade sharpening system of claim 15, comprising a movable platform secured to the first substantially flat plate, and configured to facilitate movement of the blade sharpening system relative to the agricultural implement.

* * * * *